March 13, 1945.    H. H. HAYNES    2,371,519
EXTENSION AND REDUCTION APPLIANCE
Filed Nov. 12, 1942    3 Sheets-Sheet 2
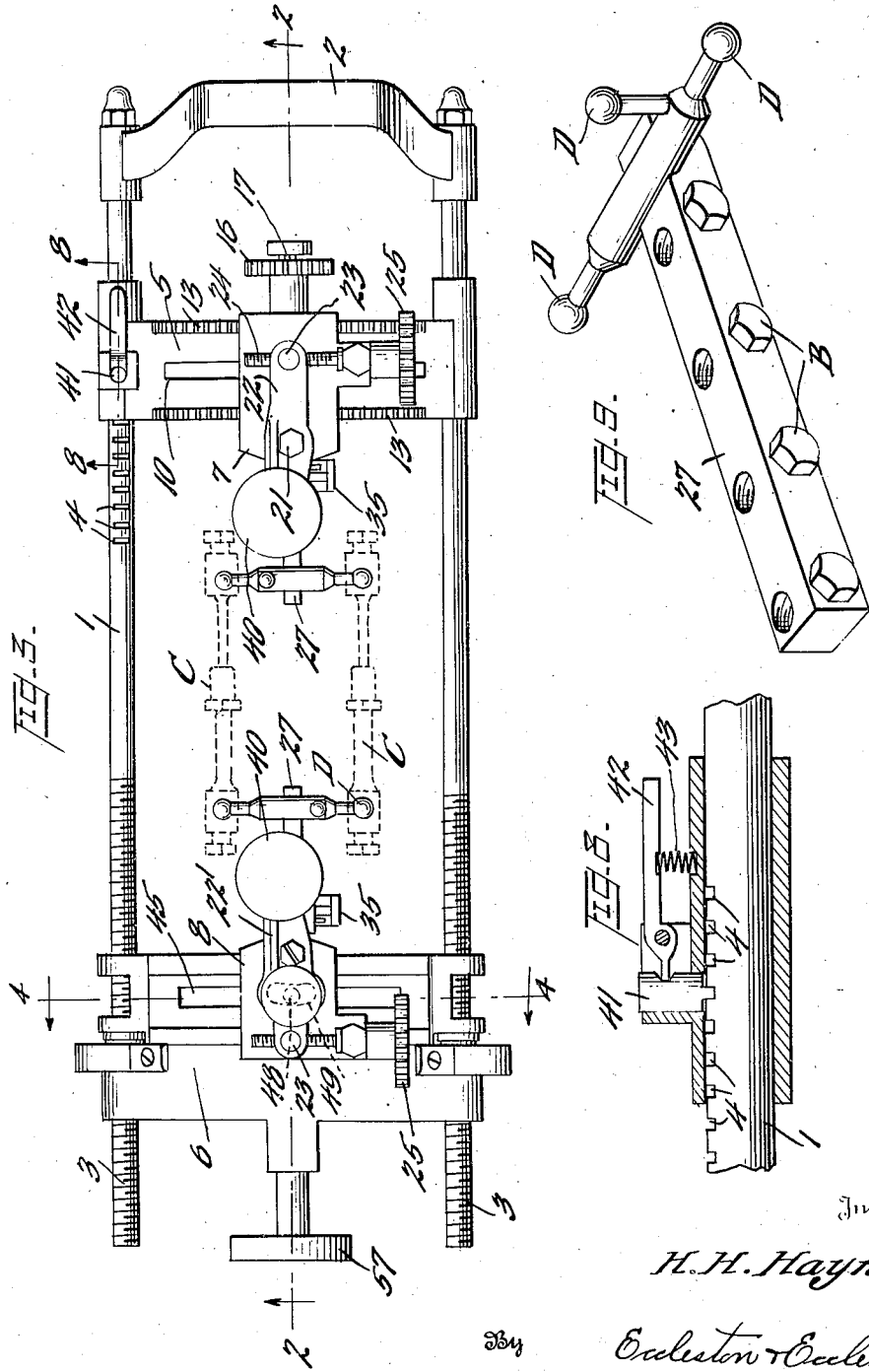
Inventor
H. H. Haynes,
By Eccleston & Eccleston,
Attorneys

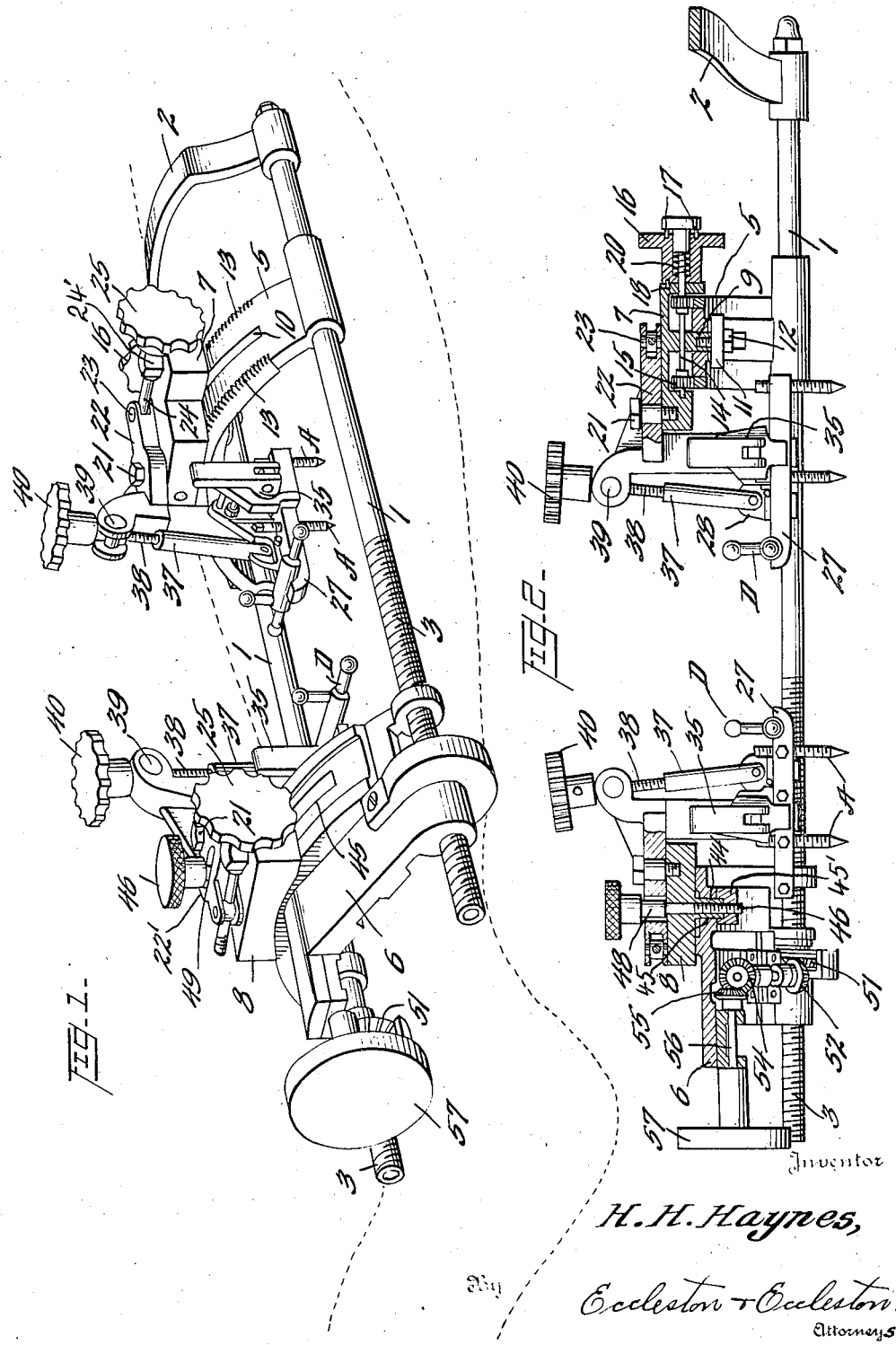

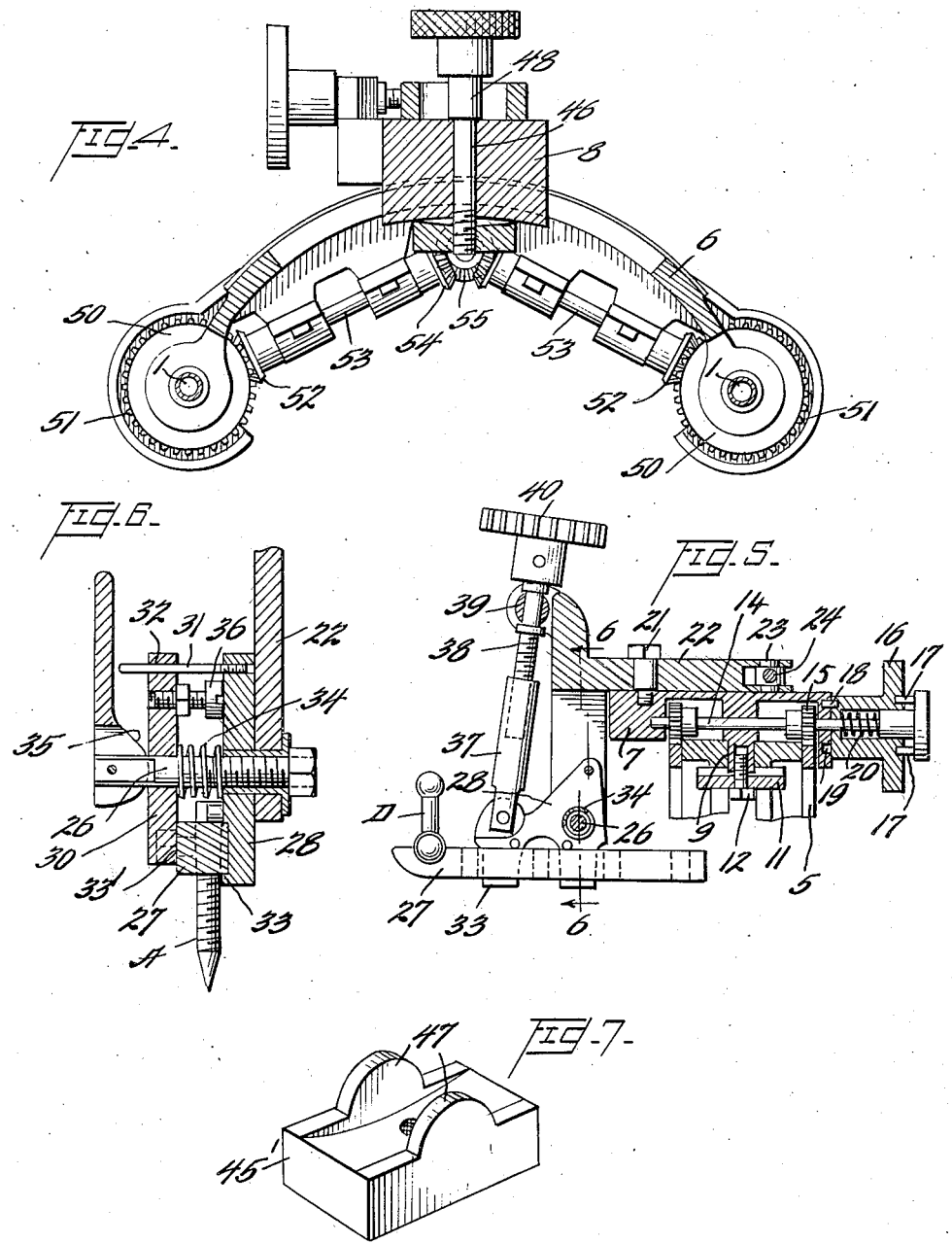

Patented Mar. 13, 1945

2,371,519

UNITED STATES PATENT OFFICE 2,371,519

EXTENSION AND REDUCTION APPLIANCE

Herbert H. Haynes, Clarksburg, W. Va.

Application November 12, 1942, Serial No. 465,354

4 Claims. (Cl. 128—84)

This invention relates to extension and reduction apparatus generally but is particularly intended for use in conjunction with the installation of the type of ambulatory splint shown in my Patent #2,238,870, granted April 15, 1941.

A primary object of the invention resides in the provision of a small and light weight mechanism of this general type which may conveniently rest upon the limb of a patient while being attached to the splint parts during the process of aligning the bone fragments, whereby the apparatus is not only readily portable but also the operative mechanism is relatively close to the bone so as to reduce to a minimum the strain applied to the structural parts of the apparatus and likewise the amount of yield or give of the parts, thereby promoting lightness of apparatus and permanency of adjustment of the bone fragments. The lightness of the apparatus, approximately 9 pounds, permits it to be readily supported on the limb of a patient through the medium of skeletal screws, without becoming burdensome, and permits the limb to be moved to various positions for viewing through a fluoroscope.

Another object of the invention consists in providing a simple but extremely accurate appliance for properly aligning the bone fragments of an injured limb.

A further object of the invention resides in the provision of such a device in the nature of a precision instrument whereby the bone fragments may be minutely adjusted in any desired direction so as to accurately align the fragments and cause a proper mating of the abutting ends.

Another object of the invention resides in the provision of an extension and reduction appliance which may be quickly and easily applied to the skeletally attached base members shown in the above-mentioned patent.

Other objects and advantages of the invention will be apparent from the following description when taken in connection with the accompanying drawings, in which, Figure 1 is a perspective view of the appliance.

Figure 2 is a vertical sectional view taken on line 2—2 of Figure 3.

Figure 3 is a top plan view of the apparatus.

Figure 4 is a transverse sectional view taken on line 4—4 of Figure 3.

Figure 5 is an enlarged sectional detail view through the carriage at the right of Figures 1 and 2.

Figure 6 is an enlarged detail sectional view of one of the clamps, taken on line 6—6 of Figure 5.

Figure 7 is a perspective view of a clamping shoe.

Figure 8 is an enlarged sectional detail taken on line 8—8 of Figure 3, and

Figure 9 is a perspective view of one of the base members of the skeletal splint.

Referring to the drawings in greater detail the numeral 1 indicates a pair of parallel rods, which in conjunction with the cross-bar and handle 2, provide a supporting frame for the operative parts of the appliance. The rods 1 are preferably of tubular form for the sake of lightness, and are threaded at one end, as indicated by numeral 3, to provide for a micrometer adjustment of one of the carriages. The other end of one of the bars is preferably provided with a series of transverse notches 4 for cooperation with a latch on the other carriage to provide a relatively rough adjustment of the latter.

The operative part of the appliance comprises a pair of carriages 5 and 6 which are arched as indicated in Figures 1 and 2 to permit of suspending a pair of clamping members in substantially the plane of the frame 1—2.

The carriages 5 and 6 are slidably mounted on the rods 1, and tangentially mounted on the arch of carriage 5 is a plate 7, while a similar plate 8 is similarly mounted on the arch of carriage 6. The plate 7 is provided with a downward extension 9 which is received in an elongated slot 10 in the arch portion of carriage 5 and held therein by means of a washer 11 and nut 12 threaded onto a threaded portion of the extension 9. The arched portion of the carriage 5 is provided with a pair of arcuate racks 13, and the plate 7 carries a shaft 14 provided with a pair of pinions 15 for cooperation with the racks 13.

The shaft 14 is adapted to be rotated by means of a hand wheel 16 which is keyed to the shaft 14 by means of a pair of pins 17 carried by the shaft, or other suitable means. Accidental movement of the plate 7 is prevented by means of a pin 18 on the hub of wheel 16 which is adapted to cooperate with an annular series of apertures 19 in a side of the plate 7. A spring 20 within the hub of wheel 16 normally forces the pin 18 in one of the apertures 19, and it will be apparent that in order to adjust the plate 7 it is necessary to first withdraw the pin from its aperture 19 against the pressure of spring 20.

Pivotally mounted on the upper side of plate 7, as by means of pivot pin 21, is an L-shaped arm 22, one portion of the arm extending vertically downwardly toward the plane of the frame 1—2. The other member of the L-shaped arm 22 extends horizontally of the plate 7 and has swiveled thereon a pin 23 in which is threaded a screw 24. The screw 24 is rotatably mounted in a bearing 24' swivelled on a portion of plate 7 and is provided with an operating wheel or handle 25. It will thus be apparent that by operating the wheel 25 in the proper direction the arm 22 may be adjusted about its pivot 21 in the desired direction.

Pivoted upon a horizontal pivot 26 on the lower end of the vertical portion of arm 22 is a clamp for rigidly gripping one of the skeletal base members 27 of the skeletal splint heretofore referred to. This clamp comprises a plate 28 rotatably mounted on the pivot shaft 26 but fixed against sliding movement thereon, and a second plate 30 slidably mounted on shaft 26 and caused to turn therewith by reason of a pin 31 fixed to plate 28 and extending through an aperture 32 in plate 30. The plates 28 and 30 are provided with gripping jaws 33 and 33' at their lower ends and are normally held in open position by means of a coil spring 34 encircling shaft 26 and engaging the inner faces of the plates 28 and 30. Pivotally mounted on an end of shaft 26, exterior of the sliding plate 30, is a cam 35 for forcing the clamping plate 30 toward the fixed plate 28 against the pressure of spring 34, and an adjustable stop screw 36 is mounted on plate 30 to limit the inward movement of the upper portion of the plate and to provide a definite and rigid gripping action in the lower portion thereof.

In order to adjust the clamp 28—30 about its horizontal pivot a threaded sleeve 37 is pivoted to the plate 28, and cooperates with a threaded bolt 38 swiveled to a boss on arm 22 as by means of pin 39. The bolt 38 is provided with an operating knob 40 and, as will be obvious, a rotation of the knob in either direction will cause a movement of the clamp upwardly or downwardly, as the case may be.

As heretofore mentioned, the carriage 5 is longitudinally adjustable along the frame 1—2, and in order to lock the carriage in its adjusted position, a pin 41 is mounted for vertical sliding movement in an enlargement on the carriage, and is operated by means of a pivoted handle 42. The free end of pin 41 cooperates with the notches 4 on one of the rods 1 and is normally held in locking position by means of a spring 43 interposed between the carriage and handle 42.

The carriage 6 and its related parts is quite similar to carriage 5 and the parts carried thereby, and it will therefore suffice to merely describe the manner in which these two elements of the appliance differ.

The plate 8 is provided with a downward extension 44 which passes through an elongated slot 45 in the arched portion of carriage 6. Extending through the plate 8 and threaded to a shoe 45' slidably mounted on extension 44 is a bolt 46. The shoe 45' is provided with arcuate portions 47 adapted to engage the underside of carriage 6, and the bolt 46 is provided with a shoulder 48 adapted to engage the upper surface of the plate 8. By tightening up on bolt 46 it will be apparent that the plate 8 may be secured in any position to which adjusted along the arch of carriage 6.

The carriage 6 and plate 8 are provided with a clamp and adjusting means therefor identical with those previously described in connection with carriage 5, except that the horizontal portion of the arm 22' is provided with an arcuate slot 49 so that the arm may be rotated about its pivot without interference from the clamping bolt 46 carried by plate 8 on which the arm is pivoted.

The carriage 6 is mounted for a micrometer adjustment along the rods 1, and to this end wheels 50 which are rotatably mounted on the ends of carriage 6 and partly housed within are threaded on the threads of the rods 1. These wheels are of bevel gear form as indicated at 51 and cooperate with similar gears 52 fixed to the outer ends of shafts 53. These shafts are rotatably mounted in bearings on the underside of carriage 6, and are provided with bevel gears 54 at their inner ends which cooperate with a common bevel gear 55 mounted on a shaft 56 extending longitudinally of the appliance and at right angles to the shafts 53. The shaft 56 is rotatably mounted in bearings on the underside of carriage 6 and is provided with an operating knob 57. By rotating this knob in either direction a rotary movement is imparted to threaded wheels 50, thereby causing the wheels, and the carriage 6 on which they are mounted, to travel along the frame 1—2. Because of the threaded connections between these parts it will be apparent that very minute adjustments may be made when necessary.

As heretofore mentioned, the skeletal splint with which the present appliance may be used is of the type fully disclosed in Patent #2,238,870. However, a brief description of the splint will be conducive to a complete understanding of the operation of the reduction apparatus.

A portion of the injured limb to be operated upon is indicated in dotted outline in Figure 1. Attached to the two fragments of the bone, as by means of skeletal screws A, is the pair of base members or blocks 27. These blocks 27 are rigidly attached to the shafts or upper portions of the screw A by means of set screws B and it is with these skeletal base members that the present extension and reduction appliance cooperates. The gripping jaws 33—33' are rigidly clamped to the blocks 27 and the latter serve in effect as handles by means of which the bone fragments are brought into alignment and proper mating position. Thereafter the extensible rods C are clamped to the ball portions D of the blocks so as to fixedly retain the bone fragments in their adjusted positions after the extension and reduction appliance is detached from the blocks 27.

It is believed that the operation of the present apparatus will be readily apparent to those skilled in the art. After the skeletal base members 27 have been secured to the bone fragments the frame 1—2 is placed over the limb of the patient. Adjustment of the clamps 33—33' to the base members 27 may be made by adjusting either or both of the carriages 5 and 6 along the frame 1—2 and by suitably rotating the adjusting knobs, on these carriages. After these adjustments, the clamps may be quickly and rigidly secured to the members 27 by merely operating the cams 35 against the pressure of springs 34.

The fracture may now be reduced by adjusting the carriage 6 through the medium of the knob 57 and the transmission devices therefrom to the threaded wheels 50 which cooperate with the threaded rods 1—1. After the fracture has been reduced the bone fragments may be brought into their final and correct positions by suitably adjusting the plates 7 and 8, along the arches of the carriages, and by rotating the knobs 25 and 40 to move the blocks in the various planes to obtain exact positioning of the bone fragments. Thereafter the carriage 6 may be moved toward carriage 5 by rotating knob 57 so as to bring the ends of the bone fragments into abutting relationship. It is to be understood of course that these various adjustments are to be made in conjunction with the frequent use of a fluoroscope so as to determine the relative position of the bone fragments from time to time. The extreme lightness of the apparatus and its support on the patient's limb through the medium of the skeletal screws, permits the patient's limb to be moved to various positions so that the fracture may be viewed through the fluoroscope from various angles.

From the foregoing description and the attached drawings it will be apparent that the appliance is relatively small and light in weight; that no cumbersome base or supporting standard is necessary to its efficient operation; and that when mounted on the base members and ready for aligning the bone fragments it is quite close to the limb, thereby reducing to a minimum any leverage action of the operative parts of the mechanism and also reducing any give or yield of the parts and promoting accuracy of adjustment of the bone fragments.

In accordance with the patent statutes I have described what I now believe to be the preferred form of construction of the apparatus, but inasmuch as various changes may be made in structural details without departing from the spirit of the invention it is intended that all such changes be included within the scope of the appended claims.

What is claimed is:

1. An extension and reduction apparatus for use in conjunction with an ambulatory splint, including a frame and two carriages movably mounted thereon for adjustment toward and from each other, a clamp carried by each carriage, and each clamp adapted to hold a skeletal base member having skeletal pins engaging the bone fragments, means for adjusting the carriages toward and from each other, and means associated with each carriage to adjust the said clamps and the skeletal base members carried thereby to reduce the fracture and properly position and mate the bone fragments, and means carried by each of said skeletal base members for securing thereto the ends of rods to form an ambulatory splint, whereupon the extension and reduction apparatus is removed by releasing said clamps from said skeletal base members.

2. An extension and reduction apparatus for use in conjunction with an ambulatory splint, including a frame and two carriages movably mounted thereon for adjustment toward and from each other, a clamp carried by each carriage, and each clamp adapted to hold a skeletal base member having skeletal pins engaging the bone fragments, means for adjusting the carriages toward and from each other, and means associated with each carriage to adjust the clamps and the skeletal base members carried thereby to reduce the fracture and properly position and mate the bone fragments, and ball-shaped members carried by each of said skeletal base members for securing thereto the ends of rods to form an ambulatory splint, whereupon the extension and reduction apparatus is removed by releasing said clamps from said skeletal base members.

3. An extension and reduction apparatus for use in conjunction with an ambulatory splint, including a frame and two carriages movably mounted thereon for adjustment toward and from each other, each of the carriages being arched above the said frame, a clamp suspended from each carriage in substantially the plane of said frame, each clamp adapted to hold a skeletal base member having skeletal pins engaging the bone fragments, means for adjusting the carriages toward and from each other, and means associated with each carriage to adjust the said clamps and the skeletal base member carried thereby to reduce the fracture and properly position and mate the bone fragments, and means carried by each of said skeletal base members for securing thereto the ends of rods to form an ambulatory splint, whereupon the extension and reduction apparatus is removed by releasing said clamps from said skeletal base members.

4. An extension and reduction apparatus for use in conjunction with an ambulatory splint, including a frame and two carriages movably mounted thereon for adjustment toward and from each other, each of the carriages being arched above the said frame, a clamp suspended from each carriage in substantially the plane of said frame, means for adjusting the suspending means along the arch of the carriages, means for adjustably raising and lowering the clamps, means for adjusting the clamps laterally, means for adjusting the carriages toward and from each other, each clamp adapted to hold a skeletal base member having skeletal pins engaging the bone fragments, and means carried by each of said skeletal base members for securing thereto the ends of rods to form an ambulatory splint, whereupon the extension and reduction apparatus is removed by releasing said clamps from said skeletal base members.

HERBERT H. HAYNES.